United States Patent

Ebihara et al.

Patent Number: 5,424,084
Date of Patent: Jun. 13, 1995

[54] PROCESS FOR PREPARING COLLAGEN BEADS

[75] Inventors: Tetsuya Ebihara; Yasushi Okamoto, both of Tokyo, Japan

[73] Assignee: Nippi, Incorporated, Tokyo, Japan

[21] Appl. No.: 140,131

[22] PCT Filed: May 1, 1992

[86] PCT No.: PCT/JP92/00573
§ 371 Date: Nov. 2, 1993
§ 102(e) Date: Nov. 2, 1993

[87] PCT Pub. No.: WO92/19115
PCT Pub. Date: Nov. 12, 1992

[30] Foreign Application Priority Data

May 2, 1991 [JP] Japan .................................. 3-100860

[51] Int. Cl.[6] .................................. A23L 1/0562
[52] U.S. Cl. .................................. 426/276; 426/573; 426/657
[58] Field of Search ................ 426/276, 573, 657, 104; 530/356; 106/124, 125

[56] References Cited

U.S. PATENT DOCUMENTS

| | | | |
|---|---|---|---|
| 4,202,908 | 5/1980 | Nesmeyanov et al. | 426/104 X |
| 4,375,481 | 3/1983 | Kuwabara et al. | 426/104 X |
| 4,702,921 | 10/1987 | Ueda | 426/104 X |
| 5,223,029 | 6/1993 | Oonishi et al. | 106/124 X |

FOREIGN PATENT DOCUMENTS

| | | | |
|---|---|---|---|
| 53-13697 | 5/1978 | Japan . | |
| 53-31933 | 9/1978 | Japan . | |
| 54-110352 | 8/1979 | Japan | 426/276 |
| 64-1169 | 1/1989 | Japan . | |
| 3-61451 | 3/1991 | Japan | 426/657 |

*Primary Examiner*—Arthur L. Corbin
*Attorney, Agent, or Firm*—Browdy and Neimark

[57] ABSTRACT

Collagen beads prepared by adding spherical droplets of an aqueous liquid of collagen to an aqueous solution of tannin. The collagen beads show a uniform grain size and have either a two-layered structure consisting of an aqueous liquid sustained inside a solidified outer surface or a completely solidified form.

13 Claims, No Drawings

PROCESS FOR PREPARING COLLAGEN BEADS

TECHNICAL FIELD

This invention relates to collagen beads and a process for producing the same.

BACKGROUND OF THE INVENTION

Bead-type shaped articles produced by using biopolymers (for example, proteins, polysaccharides and the like) have been utilized as bead foods and as supports for immobilizing physiologically active substances.

As a bead-type food, for example, Japanese Patent Laid-Open No. 79755/1976 proposes a process for producing a fish roe-like food which comprises gelatinizing cold-gelling and edible aqueous sol droplets (for example, gelatin) by cooling, further coating the gelatinized particles thus formed with a film-forming sol and contacting the same with a gelling agent to thereby form a gelatinized film layer. Further, Japanese Patent Publication No. 11101/1970 proposes to provide gelatinized alginate particles by treating an alginate with a divalent metal ion which can be incorporated into the body of a living organism.

As a bead-type shaped article produced with the use of collagen, Japanese Patent Publication No. 1169/1989 describes a process for producing collagen beads which are usable as a support for immobilizing a physiologically active substance. This process comprises forming collagen spheres in an organic solvent which is hardly miscible or immiscible with water and then hardening the spheres.

However there has been developed no bead-type shaped collagen article which is applicable to foods.

In the conventional methods for producing collagen beads as described above, an aqueous liquid of a high concentration of a collagen material is employed and a hardly miscible or immiscible organic solvent is used during the production process. In general, many hardly miscible or immiscible organic solvents are harmful to human beings. Therefore, the production of beads with the use of such organic solvents suffers from problems of the contamination and remaining of the organic solvents in the beads. In the conventional methods, furthermore, aldehydes and metal salts such as chromium salts are used in order to harden or crosslink collagen. Therefore, the beads thus obtained are hardly applicable to foods.

SUMMARY OF THE INVENTION

In the present invention, no organic solvent but an aqueous liquid of a collagen material of a low concentration is used and, therefore, the beads are never contaminated with any organic solvent. Further, a substance used in the present invention for hardening the beads thus formed has a high degree of safety when applied to foods. Furthermore, the present invention makes it possible to produce collagen beads in a large amount industrially.

The present inventors have conducted extensive studies in order to provide a highly safe solution wherein the employed solvent is other than a hardly miscible or immiscible organic solvent, and an aqueous liquid of a collagen material can be formulated into spherical beads simply by dropping the aqueous collagen liquid into said solvent. As a result, they have successfully found out that spherical collagen beads can be formed by dropping an aqueous liquid of a collagen material into an aqueous solution of tannin which is a natural organic compound frequently contained in, for example, foods and drugs. They have further found out that when the collagen beads thus formed are maintained in the aqueous solution of tannin, tannin penetrates into the spherical collagen beads to thereby solidify the collagen beads.

On the basis of these findings, the present inventors have discussed the concentration of the collagen material in the aqueous liquid of the collagen material, the concentration of tannin in the aqueous tannin solution and the pH value of the aqueous tannin solution, each required for the formation of the collagen beads, thus completing the present invention.

DETAILED DESCRIPTION OF THE INVENTION

Collagen is a protein hardly soluble in water which constitutes animal connective tissues such as bone and skin, and is in the form of rods with a helical structure consisting of three peptide chains (molecular weight: 300,000, length: 300 nm, diameter: 1.5 nm). Different from gelatin obtained by denaturing collagen, collagen is characterized by not setting into gel, i.e. gelling, even at a low temperature.

As the aqueous liquid of a collagen material to be used as the starting material in the present invention, collagen which has been solubilized by treating with an enzyme or an alkali (refer to Japanese Patent Publication No. 11037/1969 and No. 15033/1971) may be cited. To form collagen beads, the concentration of the collagen material in the aqueous liquid of the collagen material ranges from about 0.1 to about 2.0% by weight. The tannin to be used in the present invention is not particularly restricted. Namely, it may be arbitrarily selected from among those satisfying the common definition of tannin, i.e., "a water-soluble, polyphenol compound originating from a plant and becoming turbid or giving a precipitate in a solution together with proteins or alkaloids".

The concentration of the aqueous tannin solution may be at such a level as to maintain the aqueous liquid of the collagen material in the form of spheres therein. That is to say, it may range from about 0.1 to about 10.0% by weight, preferably from about 0.5 to about 5% by weight. Further, the pH value of the aqueous tannin solution may fall within a range wherein tannin is not oxidized. It usually ranges from about pH 2 to about pH 7, preferably from about pH 2 to about pH 4.

As described above, tannin would generally form a precipitate together with a protein in a solution. However, the collagen material to be used as the starting material in the present invention would not become turbid within the concentration range of the collagen material as specified above. When an aqueous solution of the collagen material was dropped into an aqueous tannin solution, however, it forms a precipitate in the form as it is. When the concentration of the collagen material in the aqueous liquid thereof is higher than the level as specified above, therefore, the aqueous liquid of the collagen material dropped into the aqueous tannin solution would solidify not in the form of spheres but in the form of droplets as it is, because of the high viscosity of the aqueous liquid. When the concentration of the collagen material is lower than the level as specified above, on the other hand, the aqueous liquid of the collagen material dropped into the aqueous tannin solution would diffuse into small pieces, thus becoming turbid similar to other proteins.

The particle size of the collagen beads can be arbitrarily determined by varying the droplet size, the concentration of the collagen material in the aqueous liquid thereof, the concentration of tannin in the aqueous solution thereof (i.e., the immersion liquid), etc. For example, when an aqueous liquid of a collagen material at a concentration of 0.1 to 2.0% by weight is dropped into an aqueous tannin solution at a concentration of 0.1 to 10.0% by weight through a nozzle of 0.5 mm in inner diameter, the particle size of the collagen beads thus formed can be varied within a range of from 2.0 to 4.0 mm by controlling the concentrations of the collagen material and tannin. When the aqueous liquid of the collagen material is dropped into the aqueous tannin solution through a nozzle of 3 mm in inner diameter, the particle size can be similarly varied within a range of from 3.0 to 8.0 mm.

According to the present invention, droplets comprising the spherical aqueous liquid of the collagen material can be formed by dropping the above-mentioned aqueous liquid of the collagen material into the aqueous tannin solution. Then the aqueous tannin solution is allowed to stand under slowly stirring. Thus the tannin penetrates into the spherical collagen beads and solidifies collagen therein. Further, the surface and internal structures of the beads can be changed by controlling the penetration time. When the immersion time is from 30 seconds to 30 minutes, collagen beads of a two-layered structure, wherein the external surface solidifies while the content remains in the form of the aqueous liquid differing in the degree of solidification, are usually obtained, though this phenomenon depends on the concentration of the collagen material and the concentration of tannin in the immersion aqueous solution. When the immersion is performed for 30 minutes or longer, collagen beads which have been uniformly and completely solidified can be obtained. That is to say, the ratio of tannin to the collagen material in the collagen beads according to the present invention can be arbitrarily varied by controlling the concentration of the aqueous tannin solution and the immersion time. When a double-walled coaxial nozzle is used and the above-mentioned aqueous liquid of the collagen material is extruded into the outer part of the coaxial nozzle while various aqueous liquids and oily substances are extruded into the inner part thereof at the same time followed by dropping into the aqueous tannin solution, furthermore, collagen beads consisting of a solidified outer surface and a content comprising a liquid or a gel of the substances other than collagen enclosed therein can be prepared.

Further, substances other than collagen may be mixed with the aqueous liquid of the collagen material. In this case, collagen beads having said substances enclosed therein can be obtained. For example, collagen beads can be prepared by mixing 5 parts by weight of a collagen material with 1 part by weight of dextran (molecular weight distribution: about 60,000 to about 90,000) and dropping the obtained mixture into a 10.0% by weight aqueous tannin solution. When these collagen beads are allowed to stand in a solution of pH 4.0 for 5 hours, the amount of the dextran released from the collagen beads is not more than 0.1%. However, the substances capable of being enclosed in these beads are restricted to polymers having a molecular weight of at least about 60,000. Preferable examples thereof include water-soluble proteins and polysaccharides such as dextran as described above, BSA, starches, pectin and carrageenan, though substances which are hardly soluble or insoluble maybe used so long as they can be fully diffused in the aqueous solution of collagen without undergoing coagulation or separation. In contrast, low molecular weight substances such as amino acids and mono-, di- or oligo-saccharides can freely permeate through collagen beads. Accordingly, collagen beads containing a low molecular weight substance can be produced by immersing collagen beads in a solution of such a substance and equilibrating the beads and the solution.

The present invention aims at providing collagen beads applicable to foods and a process for producing the same. The collagen beads of the present invention, which are prepared substantially from collagen and tannin, can be suitably used in foods, different from the conventional ones.

Namely, these collagen beads are applicable to foods, for example, a fish roe-like food consisting of an outer coating and an inner solution enclosed therein and confectionery. In these cases, the beads may contain substances other than collagen such as coloring matters and flavorings. Regarding coloration, in particular, collagen beads of a gray or black color can be obtained by immersing in a solution containing ferric ions, since the beads consist of collagen and tannin. These products thus obtained are usable as a caviar-like food.

In addition, the collagen beads of the present invention, which are free from heavy metals, are usable as a support on which physiologically active substances such as enzymes are immobilized without being inactivated.

To further illustrate the present invention in greater detail, the following Examples will be given. However, it is to be understood that the present invention is not restricted thereto.

BEST MODE FOR CARRYING OUT THE INVENTION

EXAMPLE 1

An aqueous liquid of enzymatically solubilized collagen (pH 5.0, concentration: 1.0% by weight) was sufficiently degassed under reduced pressure. Then it was dropped into an aqueous solution of tannic acid (pH 5.0, concentration: 1.0% by weight) through a nozzle of 0.5 mm in diameter with the use of a peristaltic pump at a flow rate of 2.0 ml/min. After the completion of the addition, the aqueous solution of tannic acid was allowed to stand under slow stirring for 2 hours and was then sufficiently washed with distilled water. Thus uniform collagen beads of 2.8±0.1 mm in diameter were obtained.

EXAMPLE 2

An aqueous liquid of enzymatically solubilized collagen (pH 8.0, concentration: 0.54 by weight) was sufficiently degassed under reduced pressure. Then it was dropped into an aqueous solution of grape seed tannin (pH 3.0, concentration: 7.5% by weight) through a nozzle of 0.5 mm in diameter with the use of a peristaltic pump at a flow rate of 2.0 ml/min.

The grape seed tannin was isolated in the following manner. Namely, 100 g of grape seeds were ground and sufficiently defatted with the use of hexane. Next, polyphenol was extracted by using 100 ml of 50% ethanol.

After concentrating the obtained extract under reduced pressure to thereby eliminate the ethanol, the residue was centrifuged and the precipitate was removed. To the obtained supernatant, was added diethyl ether. After thoroughly stirring, the aqueous layer was collected and freeze-dried. The powder thus obtained was used as the grape seed tannin.

After the completion of the addition, the aqueous solution of grape seed tannin was allowed to stand under slow stirring for 2 hours. Then collagen beads were taken out from the aqueous solution of grape seed tannin and thoroughly washed with distilled water. Thus uniform collagen beads of 2.4±0.1 mm in diameter were obtained.

EXAMPLE 3

An aqueous liquid of enzymatically solubilized collagen (pH 3.0, concentration: 1.0% by weight) was mixed with 1.0% by weight alkali-treated gelatin at a ratio of 1:1 at 30° C. and then defoamed under reduced pressure. Then it was dropped into an aqueous solution of tannic acid (pH 4.0, concentration: 3.0% by weight) through a nozzle of 0.7 mm in diameter with the use of a peristaltic pump. Within 1 minute after the completion of the addition, collagen beads were taken out from the aqueous solution of tannic acid and immersed in a 10% solution of sodium chloride for 2 hours. Thus, a food having a particle size of 5.2±0.1 mm was obtained that had a fish roe-like texture with an internal sol phase.

EXAMPLE 4

An aqueous liquid of enzymatically solubilized collagen (pH 3.0, concentration: 0.5% by weight) was mixed with soybean oil at a ratio of 3:1 and emulsified. The obtained emulsion was then dropped into an aqueous solution of tannic acid (pH 3.0, concentration: 5.0% by weight) through a nozzle of 0.5 mm in diameter with the use of a peristaltic pump. Within 2 minutes after the completion of the addition, beads were taken out from the aqueous solution of tannic acid, colored in gray by immersing in a 0.5% solution of iron chloride for 30 seconds and then immersed in a 5.0% solution of sodium chloride for 2 hours. Thus a caviar-like food being similar to caviar in color tone, taste and texture were obtained.

EXAMPLE 5

To 50 ml of an aqueous liquid of alkali-solubilized collagen (pH 3.0, concentration: 2.0% by weight), was added 5 mg (2,000 U) of invertase, i.e., a sugar hydrolase and dissolved therein by mixing. After defoaming by using a cold-centrifuge, the mixture was introduced into an injection tube and dropped into an aqueous solution of tannic acid (pH 3.0, concentration: 2.0% by weight) through a syringe of 0.2 mm in inner diameter. After the completion of the addition, the aqueous tannin solution was allowed to stand at 4° C. under slow stirring for 4 hours and was then thoroughly washed with an aqueous solution (pH 3.0). Thus collagen beads (particle size: 2.5±0.1 mm) on which the invertase had been immobilized were obtained. When the enzymatic activity of the invertase immobilized on these collagen beads was determined with the use of sucrose as the substrate in a solution of pH 4.0, it was found that the enzyme fully sustained its activity.

What is claimed is:

1. A process for producing collagen beads which comprises adding spherical droplets of an aqueous liquid of a collagen material, containing about 0.1 to about 2.0% by weight of collagen, to an aqueous tannin solution to thereby form spherical solidified collagen beads.

2. A process as claimed in claim 1 wherein said aqueous liquid of collagen material is solubilized collagen.

3. A process as claimed in claim 1 wherein the tannin concentration of said aqueous tannin solution ranges from about 0.1 to about 10% by weight and the pH value of said solution ranges from about 2 to about 7.

4. A process according to claim 3 wherein said tannin concentration ranges from about 0.5 to about 5% by weight, and said pH value ranges from about 2 to about 4.

5. A process as claimed in claim 1, wherein the tannin concentration of said aqueous tannin solution ranges from about 0.1 to about 10% by weight and the pH value of said solution ranges from about 2 to about 7.

6. A method according to claim 1 comprising controlling the droplet size so as to form said spherical solidified beads having a particle size of from 2.0 to 8.0 mm.

7. A process according to claim 1 further comprising slowly stirring said aqueous tannin solution after addition of said spherical droplets.

8. A process according to claim 1 comprising maintaining said droplets in said aqueous tannin solution for from 30 seconds to 30 minutes to form said spherical solidified beads having a two-layered structure comprising a solid external surface and a liquid interior.

9. A process according to claim 1 comprising maintaining said spherical droplets of collagen in said aqueous tannin solution for at least 30 minutes to form said spherical solidified beads in completely solidified form.

10. A process according to claim 1 further comprising contacting said spherical solidified beads with a ferric ion solution, a sodium chloride solution, or both a ferric ion solution and a sodium chloride solution.

11. A process according to claim 1 wherein said aqueous liquid of a collagen material containing from about 0.1 to about 2.0% by weight of collagen further comprises a polymer having a molecular weight of at least about 60,000 and which is fully diffused in said aqueous liquid of collagen.

12. A process according to claim 1 wherein said aqueous liquid of a collagen material containing from about 0.1 to about 2.0% by weight of collagen further comprises invertase.

13. A process for producing collagen beads, comprising:
    forming an aqueous liquid consisting essentially of a collagen material having a collagen concentration from about 0.1 to about 2.0% by weight;
    providing an aqueous tannin solution;
    adding said aqueous liquid consisting essentially of collagen material dropwise to said aqueous tannin solution thereby providing droplets of collagen in said aqueous tannin solution; and
    maintaining said collagen droplets in said aqueous tannin solution for a time sufficient to solidify at least an outer layer of said collagen droplets and thus form collagen beads.

* * * * *